United States Patent

[11] 3,625,828

[72] Inventor Charles Edward Brownewell
    Elkhart, Ind.
[21] Appl. No. 816,813
[22] Filed Apr. 16, 1969
[45] Patented Dec. 7, 1971
[73] Assignee Miles Laboratories, Inc.
    Elkhart, Ind.

[54] PROCESS FOR PRODUCTION OF GLUCOSE ISOMERASE
    1 Claim, No Drawings

[52] U.S. Cl. .................................................. 195/66 R, 195/31
[51] Int. Cl. .................................................. C12d 13/10
[50] Field of Search .................................. 195/62, 66, 31

[56] References Cited
    FOREIGN PATENTS
    1,103,394  2/1968  Great Britain ................  195/31
    OTHER REFERENCES
    Tsumura et al., Agr. Biol. Chem., Vol. 29, No. 12, p. 1129–1134 (1965)

Primary Examiner—Lionel M. Shapiro
Attorneys—Joseph C. Schwalbach, Michael A. Kondzella, Louis E. Davidson and Harry T. Stephenson ABSTRACT: A novel glucose isomerase enzyme useful for the conversion of glucose to fructose can be prepared by growing under aerobic conditions a culture of *Streptomyces olivaceus* NRRL 3583 or mutants thereof in a medium containing appropriate nutrients and then recovering the enzyme therefrom.

PROCESS FOR PRODUCTION OF GLUCOSE ISOMERASE

BACKGROUND AND DISCUSSION OF PRIOR ART

Sweet syrups are widely used in the baking, confectionery and beverage industries, for example. These syrups generally consist of sucrose (cane sugar) or dextrose-containing products obtained from starch hydrolysis as the principal sweetening agent. When a syrup is needed that is sweeter than that obtained from sucrose, an invert sugar syrup is employed. This is produced by acid hydrolysis of sucrose to produce a mixture of about 50 percent glucose (dextrose) and about 50 percent fructose (levulose). While glucose is somewhat less sweet than sucrose, the fructose is sweeter than sucrose so that the overall sweetness is increased as compared to sucrose.

It is well known that dextrose can be converted under alkaline conditions to fructose. This conversion has great potential value in the production of sweet syrups. However, the alkaline conversion has not been commercially successful because the alkaline reaction produces an undesirably high ash level in the product syrup which is uneconomical to remove. The syrup is not acceptable unless this ash is removed.

The prior art then turned to an enzyme conversion of glucose to fructose. It was found that species of *Pseudomonas hydrophila, Streptomyces flavovireus, Streptomyces echinatur, Streptomyces achromogenus, Streptomyces albus* and the like could be grown in appropriate nutrient media to form enzymes having glucose isomerase properties. These prior art processes have not become commercially successful because either the yields of enzyme are too low during the enzyme production process or the yields of fructose are too low when the enzyme is employed to treat glucose.

DESCRIPTION OF THE INVENTION

It has now been found that a superior glucose isomerase enzyme can be prepared by growing under aerobic conditions a culture of *Streptomyces olivaceus* NRRL 3583 or mutants thereof in a medium containing appropriate nutrients and then recovering the enzyme therefrom. This enzyme can be produced in good yields and it has improved properties for converting glucose to fructose.

The organism useful in the present invention is classified as *Streptomyces olivaceus* according to well-known procedures. The particular strain of *Streptomyces olivaceus* useful in the production of the novel glucose isomerase has been deposited with the Northern Utilization Research and Development Division, Agricultural Research Service of the United States Department of Agriculture, Peoria, Ill. and has been given the identification number NRRL 3583. This culture is available to the public without restriction.

It should be understood that the process of the present invention is not limited solely to the use of *Streptomyces olivaceus* NRRL 3583, since the natural and artificial mutants of *Streptomyces olivaceus* NRRL 3583 can also be employed. Such mutants can be obtained by well-known techniques, such as X-ray and ultraviolet irradiation.

The *Streptomyces olivaceus* NRRL 3583 organism is maintained on agar slants and can be grown in a medium containing appropriate nutrients. The medium preferably contains xylose and a source of nitrogen. Preferably the medium also contains other carbohydrates and inorganic salts. Illustrative carbohydrates are corn starch, dextrose, lactose, milk solids, wheat bran and the like. Illustrative nitrogen sources are peptone, yeast extract, meat extract, amino acids and the like. Illustrative inorganic salts are sodium chloride, magnesium sulfate and the like. These carbohydrates, nitrogen sources and inorganic salts are well known in the art. The xylose employed in the growth medium can be in a purified form or it can be in the form of a crude xylose-containing material.

The organism preferably is grown under submerged fermentation conditions for about 20 to about 50 hours at a temperature of from about 15° C. to about 35° C. At temperatures below about 15° C. and at above about 35° C. the yield of desired enzyme becomes quite low. The preferred growth temperature is from about 25° C. to about 35° C. Atmospheric pressure conditions are preferably employed, but pressures above and below atmospheric can be used if desired with no particular advantages or disadvantages. The initial pH of the growth medium should also be from about 6.8 to about 7.1.

The glucose isomerase of the present invention is formed inside the bacterial cells which grow during its production. The cells can be filtered off from the fermentation beer and used directly as a source of glucose isomerase. Alternatively, the cells can be recovered by filtration and then ruptured by well-known The the resulting ruptured cells and released contents can be used as a source of glucose isomerase. Still further, the cells can be ruptured, by ultrasonic or homogenizing means for example, and the debris can be removed by centrifugation. The supernatant liquid can be used directly as a source of glucose isomerase or it can be lyophilized to a fine powder for subsequent use. The enzyme can also be recovered from the above supernatant liquid by well-known precipitating agents, such as ethanol or ammonium sulfate.

The glucose isomerase of the present invention can be assayed for its fructose-producing activity by the following two assay methods.

GLUCOSE ISOMERASE ASSAY METHOD 1

A 50 percent (weight/volume basis) aqueous solution of glucose containing 0.005 molar concentration of ammonium chloride, 0.1-molar concentration of magnesium sulfate and 0.001-molar concentration of cobaltous chloride was prepared. This solution had a pH of 9.0. A 5 ml. portion of the above buffered glucose solution was mixed with a 5 ml. portion of a glucose isomerase solution. This latter solution can be a suspension of whole bacterial cells, a suspension of ruptured cells or the enzyme solution recovered from ruptured cells. The above mixture was shaken well and incubated for 60 minutes at 70° C. A 1 ml. portion of the resulting reaction mixture was then removed and mixed with 9 ml. of 0.5 N perchloric acid. Further dilutions were made with water as necessary to give an appropriate final color development. To 1 ml. of the resulting mixture was added 0.2 ml. of a 1.5 weight percent solution of cysteine hydrochloride. To this were then added 6 ml. of a mixture of 190 ml. distilled water and 450 ml. concentrated sulfuric acid. Immediately afterwards was added 0.2 ml. of a 0.12 weight percent alcoholic solution of carbazole. The total mixture was then shaken and allowed to stand for 30 minutes at 40° C. The optical density of the resulting purple color was then measured using a light source having a wave length of 560 millimicrons. The optical density measurement so-obtained was compared to values on a standard curve of fructose concentration versus optical density. The assay was reported as percent glucose converted to fructose.

GLUCOSE ISOMERASE ASSAY METHOD 2

A 62.5 percent (weight/volume basis) aqueous solution of glucose was prepared by slowly adding with stirring 625 grams of anhydrous glucose to 300 ml. of hot-distilled water. The solution was cooled to room temperature and 125 ml. of 1-molar concentration aqueous solution of tris (hydroxymethyl) aminomethane at pH 8.5, 125 ml. of 1-molar concentration aqueous magnesium sulfate solution and 50 ml. of 0.025 molar concentration aqueous cobaltous chloride solution were added. The resulting mixture was then diluted to 1 liter with distilled water.

A 10 ml. portion of the above glucose solution was added to a 25 ml. volumetric flask. Sufficient enzyme to be assayed was added to produce a reduction of specific rotation, as hereinafter defined, of about 2.9° to about 7.5.°. The flask contents were then diluted to 25 ml. with distilled water, and the resulting mixture was incubated at 60° C. for 2 hours. The reaction was then stopped by adding 1 ml. of a 0.5-molar concentration aqueous solution of perchloric acid. The mixture was then centrifuged at 15,000 r.p.m. for 20 minutes, and the optical rotation (in degrees) of the supernatant liquid was measured by well-known techniques. A blank was run by the same procedure but without the presence of the enzyme. The optical rotation of the blank was also measured. The specific rotation, $[\alpha]_D^{25}$, of the sample or blank was $2\alpha$ or two times the observed optical rotation. The percent conversion of glucose to fructose was calculated by the following formula:

Percent glucose conversion =

$$\frac{[\alpha]_{blank} - [\alpha]_{sample}}{[\alpha]_{blank} + 92} \times 100$$

This assay method was also employed to measure activity in glucose isomerase units, wherein a glucose isomerase unit is the amount of enzyme which will convert one micromole of glucose to fructose per minute under the conditions of the assay. The enzyme activity in glucose isomerase units of the enzyme sample being assayed was calculated by the following formula:

$$GIU/_{gram} \text{ or } GIU/_{liter} = \frac{\text{micrograms fructose formed} \times 0.0463}{\text{mg. or ml. enzyme used}}$$

wherein the micrograms fructose formed were calculated by multiplying the above-calculated Percent Glucose Conversion value by $6.25 \times 10^6$.

The invention will be described in further detail in the following examples.

EXAMPLE 1

A culture of *Streptomyces olivaceus* NRRL 3583 was transferred to a 250 ml. flask containing 100 ml. of an aqueous mixture containing 1.0-percent xylose, 1.0-percent peptone, 0.50-percent meat extract, 0.25-percent yeast extract, 0.50-percent sodium chloride and 0.05-percent magnesium sulfate and having a pH of 6.8–7.0. All the above percents were on a weight/volume basis. The inoculated flask contents were then shaken on a reciprocal motion shaker with a 2 in. stroke at 176 strokes per minute for 24 hours at 30° C. The bacterial cells were filtered off from the resulting fermentation beer and were assayed by Glucose Isomerase Assay Method 1 to have at least 40-percent conversion of glucose to fructose.

EXAMPLE 2

A culture of *Streptomyces olivaceus* NRRL 3583 was transferred to an agitated aerated fermentor containing 10 liters of an aqueous mixture containing 0.7-percent xylose, 0.3-percent refined corn starch, 1.0-percent peptone, 0.50-percent meat extract, 0.25-percent yeast extract, 0.50-percent sodium chloride and 0.05-percent magnesium sulfate and having a pH of 7.0. All the above percent values were on a weight/volume basis. The agitator was rotated at 400 r.p.m. and air was passed through the medium at a rate of 3 volumes of air per volume of medium per minute. The fermentation was continued for 24 hours at 32° C. The fermentation beer was centrifuged at 40,000 r.p.m. to separate the bacterial cells. The cells were then frozen and lyophilized. The resulting enzyme powder was assayed by Glucose Isomerase Assay Method 2 to have an activity of 42.6 percent conversion of glucose to fructose.

EXAMPLE 3

A culture of *Streptomyces olivaceus* NRRL 3583 was transferred to a fermentor equipped as in example 2 containing 10 liters of the medium described in example 2. The agitator was rotated at 400 r.p.m. and air was passed through the medium at 2 liters per minute. The fermentation was continued for 48 hours at 21°–31° C. The fermentation cells were recovered, ruptured in a homogenizer and the debris was removed by a centrifuge. The resulting supernatant liquor was lyophilized, and the powder was assayed by Glucose Isomerase Assay Method 2 to contain 320 GIU/gram.

The glucose isomerase enzyme produced by the process of the present invention is useful to convert glucose to fructose, other than under assay conditions. This is described in the following example.

EXAMPLE 4

An aqueous glucose solution containing 25 percent (weight/volume basis) glucose was mixed with some bacterial cells grown in accordance with the procedure of example 2 above. The bacterial cells had been assayed by Glucose Isomerase Assay Method 2 and were used in an amount of 1.5 GIU per gram of glucose in the glucose solution. The resulting mixture having a pH of 8.0 was reacted at 60° C. for 72 hours. The resulting solution was assayed by Glucose Isomerase Assay Method 2 and indicated 40.7 percent conversion of glucose to fructose.

What is claimed is:

1. A process for the production of a glucose isomerase comprising growing under aerobic conditions a culture of *Streptomyces olivaceus* NRRL 3583 or mutants thereof in a medium containing appropriate nutrients and then recovering the enzyme therefrom.

* * * * *